United States Patent [19]

Khatib

[11] Patent Number: 5,458,777
[45] Date of Patent: Oct. 17, 1995

[54] DISTRIBUTOR FOR LIQUID SEPARATOR

[75] Inventor: Zara I. Khatib, Bellaire, Tex.

[73] Assignee: Shell Oil Company, Houston, Tex.

[21] Appl. No.: 217,303

[22] Filed: Mar. 23, 1994

[51] Int. Cl.⁶ ...................................... C02F 1/40
[52] U.S. Cl. .................... 210/519; 210/532.1; 210/538; 239/557; 239/565
[58] Field of Search ................. 210/519, 532.1, 210/538, 540, DIG. 5, 291; 239/450, 548, 556, 557, 565, 566

[56] References Cited

U.S. PATENT DOCUMENTS

| | | | |
|---|---|---|---|
| 994,155 | 6/1911 | Harris | 239/566 |
| 1,741,187 | 12/1929 | Fuqua | 210/519 |
| 2,771,320 | 11/1956 | Korwin | 239/450 |
| 3,804,261 | 4/1974 | Whelan et al. | 210/519 |
| 4,200,536 | 4/1980 | Kaufman | 210/291 |
| 4,243,528 | 1/1981 | Hubbard et al. | 210/DIG. 5 |
| 4,379,750 | 4/1983 | Tigglebeck | 210/291 |
| 4,406,789 | 9/1983 | Brignon | 210/519 |
| 4,919,777 | 4/1990 | Bull | 210/DIG. 5 |
| 5,075,001 | 12/1991 | Taylor | 210/519 |

FOREIGN PATENT DOCUMENTS 197712  12/1977  U.S.S.R. .

OTHER PUBLICATIONS

Chemical Engineers' Handbook, 5th Ed., pp. 47–49 (1973).

Primary Examiner—Christopher Upton
Attorney, Agent, or Firm—Del S. Christensen

[57] ABSTRACT

A distributor for dispersing an inlet stream into a volume within a separator vessel is provided, the volume having, in a horizontal plane, a first end and a second end, the distributor comprising:

a first distribution lateral, the first distribution lateral defining a series of nozzles extending from about the center of the volume to about the first end and then from about the first end to about the second end;

a second distribution lateral, the second distribution lateral defining a series of nozzles extending from about the center to about the second end and then from about the second end to about the first end, wherein the first and the second distribution laterals are essential symmetrical with respect to each other; and a manifold that provides a conduit from outside of the vessel to the two essentially symmetric distribution laterals.

The distributor of the present invention has been shown to significantly increase the utilization of the volume of a separator vessel. The laterals are also significantly less susceptible to plugging than branched laterals. The distributor of the present invention is also less susceptible to poor distribution caused by the distributor becoming unlevel.

1 Claim, 1 Drawing Sheet 5,458,777

DISTRIBUTOR FOR LIQUID SEPARATOR

FIELD OF THE INVENTION

The present invention relates to a distributor for dispersing a liquid phase into a vessel.

BACKGROUND TO THE INVENTION

There are many applications in the oil and chemical industries where liquid streams are distributed in a vessel or tank for the purpose of achieving a uniform residence time within the vessel or tank. Examples are liquid phase reactors, liquid-liquid or gas-liquid separators and electrostatic precipitators. In these applications, it is desirable to provide liquid distribution uniformly across a horizontal cross-section of the vessel or tank. Uniformly distributing the liquids maximizes the apparent residence time within the vessel. The size vessel required for the service is thereby reduced or the results achieved by a certain vessel are increased.

Inlet streams to separators are typically distributed by perforated-pipe distributors. A perforated-pipe distributor is a pipe having nozzles (typically holes drilled through the pipe) along its length to distribute the inlet flow into the vessel along the length of the pipe. When the separator is a horizontal vessel, a single distributor is often provided parallel to the longitudinal axis of the vessel, near the bottom of the vessel. A plurality of parallel distributor pipes have been provided in order to improve the utilization of the vessel's volume. A plurality of parallel distributor pipes would be expected to distribute the inlet stream over a larger portion of the cross section of the vessel, resulting in greater utilization of the vessel volume, but this has not been the typical result. Distribution of the inlet streams from parallel sets of distributor pipes has typically not been uniform, because of poor distribution to the parallel branches of the distributor. This results in a decrease in the effectiveness of the utilization of the vessel's volume.

When parallel distributor pipes have been provided as branches from a central distribution manifold, slug flows and surging inlet flows tend to move the distributors from an initial level orientation. This results in some branches being higher than others. When the inlet stream is buoyant compared to the liquids surrounding the distributor due to, for example, the inclusion of a vapor in a vapor-liquid feed stream, much more of the inlet flow will go to the higher branches. Once poor distribution begins, it will often become worse over time because branches having of lower flow rates will more quickly become plugged. Providing multiple branches also splits the flow into smaller portions, and decreases the hydraulic pressure drop in each branch. Either smaller diameter pipes must be used for the branches or the velocity of the fluids in the branches will be significantly decreased. Either of these options result in an increased tendency for the branches, and the nozzles, to plug.

It is therefore an object of the present invention to provide an apparatus to distribute flow of a liquid phase into a vessel that provides improved utilization of the vessel's volume. It is another object to provide such an apparatus wherein the apparatus contains two laterals and flow will be distributed effectively in the event that one of the two lateral becomes plugged, and in the event that the apparatus is not in a horizonal plane.

SUMMARY OF THE INVENTION

These and other objects are accomplished by a distributor for dispersing an inlet stream into a volume within a vessel is provided, the volume having, in a horizontal plane, a first end and a second end, the distributor comprising:

a first distribution lateral, the first distribution lateral defining a series of nozzles extending from about the center of the horizonal plane through the volume to about the first end and then from about the first end of the volume to about the second end of the volume;

a second distribution lateral, the second distribution lateral defining a series of nozzles extending from about the center of the horizonal plane through the volume to about the second end of the volume and then from about the second end of the volume to about the first end of the volume of the vessel wherein the first and the second distribution laterals are essentially symmetrical with respect to each other; and a manifold that provides a conduit from outside of the vessel to the two essentially symmetric distribution laterals.

Tracer tests have demonstrated that the distributor of the present invention significantly increases the utilization of the volume of a separator vessel. The laterals are also significantly less susceptible to plugging than branched laterals because of the higher inlet stream velocity for and chosen lateral size and even if one lateral does become plugged, the entire length of the volume within the vessel will be provided flow from the other distribution lateral. The distributor of the present invention is also less susceptible to poor distribution caused by the distributor becoming unlevel either in the length direction or the width direction because symmetry of the distributor will result in the inlet stream being distributed along the entire length of the vessel volume even if the distributor is not level.

DETAILED DESCRIPTION OF THE INVENTION

Figure 1:
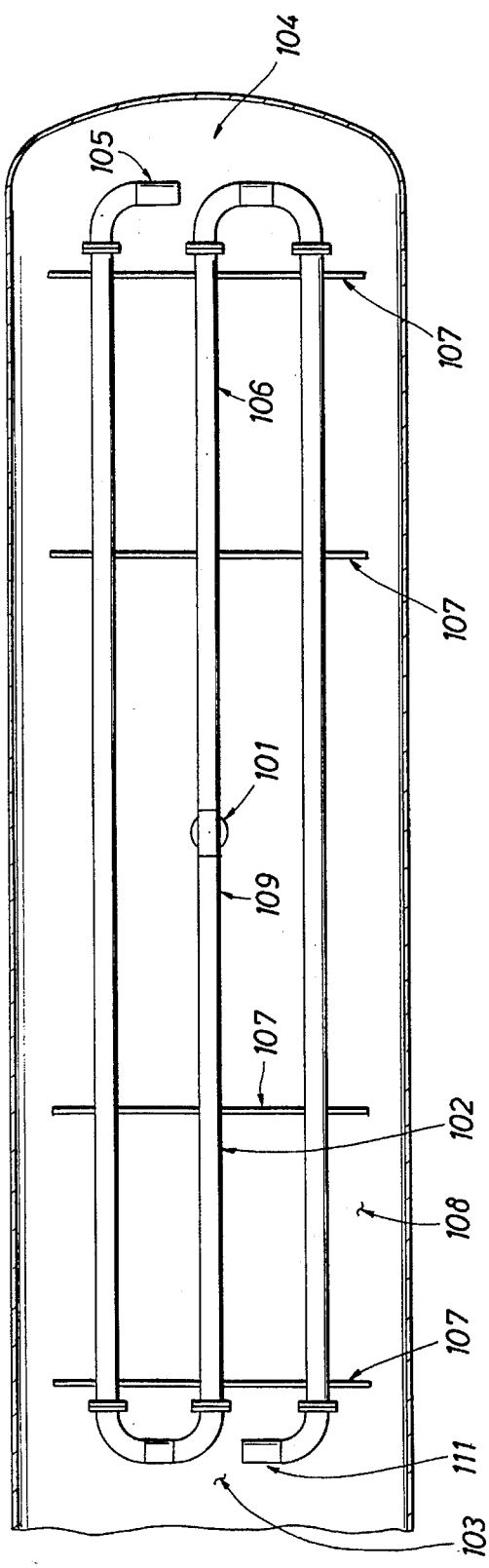
FIG. 1 is a plan view of a separator containing a distributor according to the present invention.

Referring now to FIG. 1, a plan view of a distributor, 109, of the present invention is shown in volume of a vessel, 108. A manifold, 101, is shown providing a conduit from outside of the vessel to two distribution laterals, each lateral being essentially symmetric with respect to each other. The volume of the vessel is shown as an end of a long vessel, of which the single distributor shown evenly distributes an inlet flow within this volume. Other distributors, preferably similar to the one shown, can be provided to distribute flow into the remaining volume of the vessel. A first distribution lateral, 102, is shown extending to a first end, 103, of a horizontal plane through the volume of the vessel. From the first end of the volume, the first lateral extends to the second end of the volume of the vessel, 104. At the second end of the volume the lateral may include an end segment, 105, perpendicular to the longitudinal axis of the volume to provide distribution of the inlet stream in the region of the end of the second end of the vessel, 104.

A second distribution lateral, 106, is shown extending from the manifold, 101, toward the second end of the volume of the vessel, 104, and then back to the first end of the volume, 103. The second distribution lateral, like the first distribution lateral, ends with an end segment, 111, to provide distribution of the inlet stream in the region of the end of the first end of the vessel, 103.

Both distribution laterals are braced by braces, 107, (four shown) to stabilize the laterals.

Every portion of the volume of the vessel along the length of the volume has three segments of laterals distributing inlet flow into that portion of the volume. Even if one of the two laterals becomes plugged, each of the portions of the volume will have at least one lateral distributing inlet flow into that portion. Providing duplicate coverage of each such portion of the volume of the vessel with the two distribution laterals of the present invention avoids the disadvantage of having low flow velocities or small diameter laterals, as would be needed if multiple laterals were provided to each portion of the volume through more than two laterals. This is particularly advantageous when the inlet stream contains solids. For example, fluids produced from an oil or gas production well can contain sand, scale, and oxidation products that can cause plugging of small orifices and portions of pipe having low flowrates.

Figure 2:
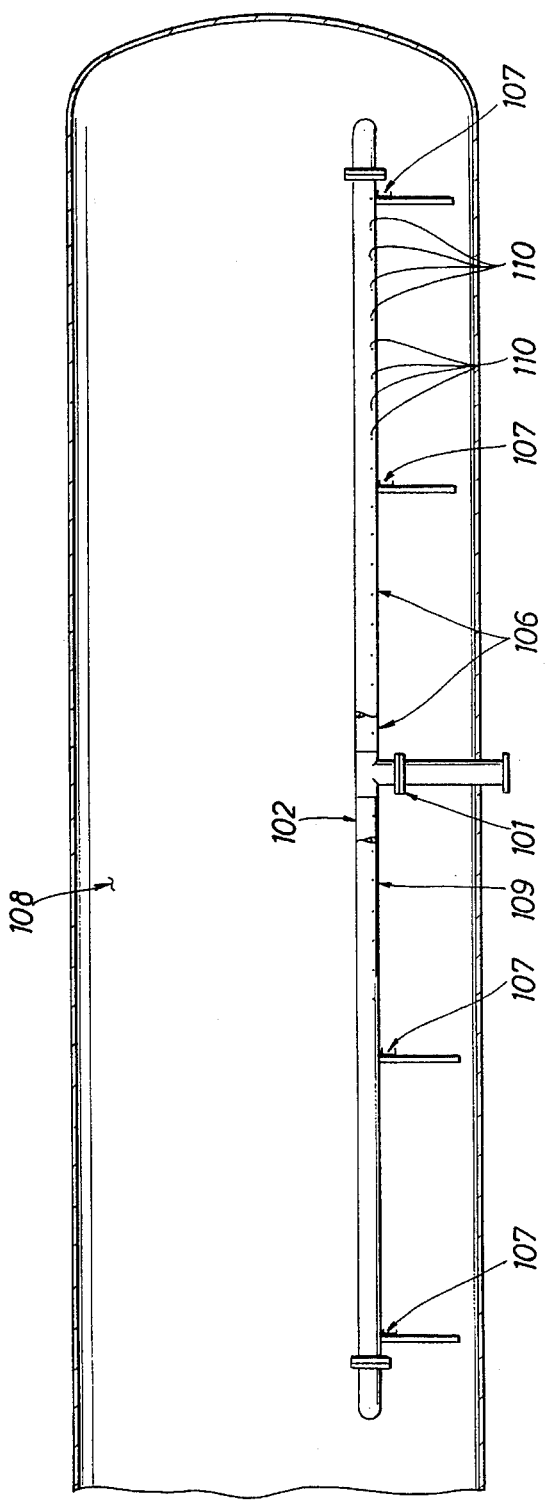
FIG. 2 is an elevation sectional view of a separator containing a distributor according to the present invention.

Referring now to FIG. 2, with like elements numbered as they are numbered in FIG. 1, a vertical section of a vessel is shown with a distributor according to the present invention. Distribution nozzles, 110, can be seen along the lower portions of each lateral. These distribution nozzles are of a size such that the pressure drop due to flow through the lateral, and the kinetic energy of the flow through the lateral are both significantly less than the pressure drop through the nozzle, thus resulting in similar amounts of inlet flow exiting the lateral from each nozzle. It is preferred that the nozzles be of a sufficiently small size that the flows through each nozzle is within about five percent of the average flow through the nozzles. In a preferred embodiment, the sizes of the nozzles are adjusted so that the flow through the nozzles are within about five percent of the average flow through the nozzles without incurring excessive pressure drop in the lateral.

The nozzles are preferably holes drilled through the lower portions of the distributor pipe. Preferably, the nozzles are orientated at an angle of about 45 degrees from horizontal. Some nozzles are preferably also placed along the top of a distributor when the distributor is separating two liquid phases. Nozzles along the top of such a distributor prevent vapors from becoming trapped in the distributor.

The vessel according to the present invention can be any tank, vertical or horizontal vessel, pond or pit in which it is desired to evenly disperse an inlet stream. The most common such vessel would be a phase separator for separation of water from an oil stream, separation of oil from a water stream or separation of gases from a liquid stream.

A distributor according to the present invention was placed in an electrostatic coalescer in an crude oil service. The vessel was a horizonal vessel with an eighty foot tangent to tangent length and a twelve foot inside diameter. The vessel originally contained two forty foot long straight distribution headers aligned about two feet from the bottom of the vessel along the center of the vessel with an inlet centered under each distribution header. The nozzle sizes (35 total) varied between 1½ and 1¼-inch diameters at 12-inch spacing, placed in the bottom of the pipes. The vessel has been in service for less than one year, and the vessel did not perform acceptably. The oil short-circuited electrostatic grids above the distribution headers, resulting in a lack of sufficient separation time. The two distributors were then replaced with two distributors according to the present invention. The new distributors were of a configuration of the distributor of FIG. 1 and FIG. 2, having a total of 198 nozzles, each spaced about six inches apart on alternating sides of the distributor pipe and being about 0.75 inches in diameter. After the distributors were replaced, the average residence time in the vessels, as determined by tracer tests, was two and a half times greater than the residence time prior to the revisions. The vessel performed acceptably after the distributors, according to the present invention, were installed.

I claim:

1. A separator vessel, the separator vessel comprising:

a vessel defining a volume, the volume having, in a horizontal plane, a first end and a second end; and a distributor, the distributor consisting essentially of:

a first distribution lateral, the first distribution lateral defining a series of nozzles, the first distribution lateral extending from about the center of the horizonal plane through the volume to about the first end of the volume and then from the first end of the volume to about the second end of the volume, a second distribution lateral, the second distribution lateral defining a series of nozzles, the second distribution lateral extending from about the center of the horizonal plane through the volume to about the second end of the volume and then from the second end of the volume to about the first end of the volume of the vessel wherein the first and the second distribution laterals are essentially symmetrical with respect to each other, and a manifold that provides a conduit from outside of the vessel to the two essentially symmetric distribution laterals.

* * * * *